(12) United States Patent
Harada et al.

(10) Patent No.: US 10,206,116 B2
(45) Date of Patent: Feb. 12, 2019

(54) RADIO BASE STATION, USER TERMINAL, RADIO COMMUNICATION SYSTEM AND RADIO COMMUNICATION METHOD

(71) Applicant: NTT DOCOMO, INC., Tokyo (JP)

(72) Inventors: Hiroki Harada, Tokyo (JP); Satoshi Nagata, Tokyo (JP); Jing Wang, Beijing (CN); Liu Liu, Beijing (CN); Huiling Jiang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 2 days.

(21) Appl. No.: 15/553,329

(22) PCT Filed: Mar. 16, 2016

(86) PCT No.: PCT/JP2016/058258
§ 371 (c)(1),
(2) Date: Aug. 24, 2017

(87) PCT Pub. No.: WO2016/148171
PCT Pub. Date: Sep. 22, 2016

(65) Prior Publication Data
US 2018/0115904 A1    Apr. 26, 2018

(30) Foreign Application Priority Data
Mar. 16, 2015  (JP) ................................. 2015-052238

(51) Int. Cl.
*H04W 16/14* (2009.01)
*H04W 74/08* (2009.01)
*H04W 72/04* (2009.01)
*H04W 72/08* (2009.01)
*H04W 74/02* (2009.01)
*H04L 5/00* (2006.01)
*H04L 27/00* (2006.01)
*H04L 27/26* (2006.01)
*H04W 84/04* (2009.01)

(52) U.S. Cl.
CPC ........... *H04W 16/14* (2013.01); *H04L 5/0094* (2013.01); *H04L 27/0006* (2013.01); *H04L 27/2602* (2013.01); *H04W 72/04* (2013.01); *H04W 72/08* (2013.01); *H04W 74/02* (2013.01); *H04W 74/0808* (2013.01); *H04W 84/042* (2013.01)

(58) Field of Classification Search
CPC ..... H04W 16/14; H04W 74/08; H04W 24/02; H04W 24/08
USPC .......................... 455/454; 370/324, 330, 350
See application file for complete search history.

(56) References Cited

PUBLICATIONS

International Search Report issued in corresponding application No. PCT/JP2016/058258 dated May 24, 2016 (2 pages).
(Continued)

*Primary Examiner* — Sam Bhattacharya
(74) *Attorney, Agent, or Firm* — Osha Liang LLP

(57) ABSTRACT

The present invention is designed to set forth a method that can prevent demodulation errors in user terminals and make maximum use of resources when data transmission is carried out by using only part of the OFDM symbols in subframes. A user terminal according to an example of the present invention has a receiving section that receives information about the number of symbols used in a given subframe of a carrier where LBT (Listen Before Talk) is configured, in the carrier, and a control section that controls a receiving process in the given subframe based on the information about the number of symbols used.

12 Claims, 19 Drawing Sheets

(56) References Cited

PUBLICATIONS

Written Opinion of the International Searching Authority issued in corresponding application No. PCT/JP2016/058258 dated May 24, 2016 (4 pages).
MediaTek Inc., "Design Considerations on LAA design"; 3GPP TSG RAN WG1 Meeting #80, R1-150575; Athens, Greece; Feb. 9-13, 2015 (8 pages).
CATT, "Design of load-based LBT for LAA"; 3GPP TSG RAN WG1 Meeting #80, R1-150110; Athens, Greece; Feb. 9-13, 2015 (6 pages).
3GPP TS 36.300 V8.5.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; May 2008 (134 pages).
Office Action issued in the counterpart Japanese Patent Application No. 2015-052238, dated Aug. 9, 2016 (9 pages).
Office Action issued in the counterpart Japanese Patent Application No. 2015-052238, dated May 17, 2016 (5 pages).
Office Action issued in the counterpart Japanese Patent Application No. 2016-198863, dated Sep. 26, 2017 (5 pages).
Intel Corporation; "Extended Subframes and (e)PDCCH for LAA downlink"; 3GPP TSG RAN WG1 Meeting #80, R1-150090; Athens, Greece, Feb. 9-13, 2015 (7 pages).
Extended European Search Report issued in corresponding European Application No. 16765000.1, dated Feb. 23, 2018 (9 pages).
MediaTek Inc.; "Discussions on LAA frame structure design and LAA-WIFI coexistence"; 3GPP TSG RAN WG1 Meeting #80, R1-150577; Athens, Greece; Feb. 9-13, 2015 (4 pages).

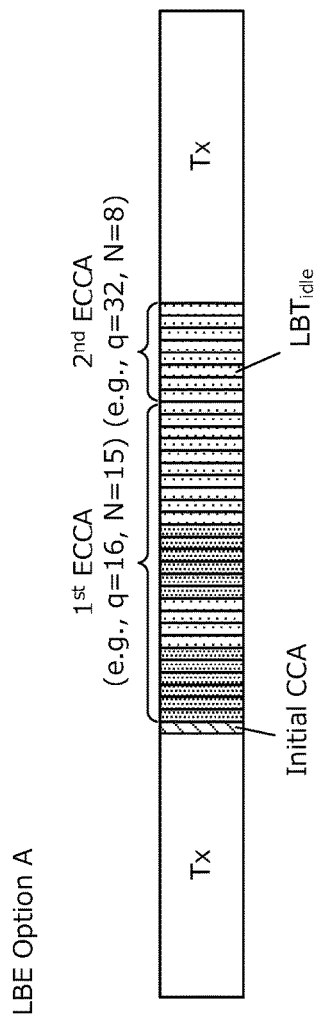
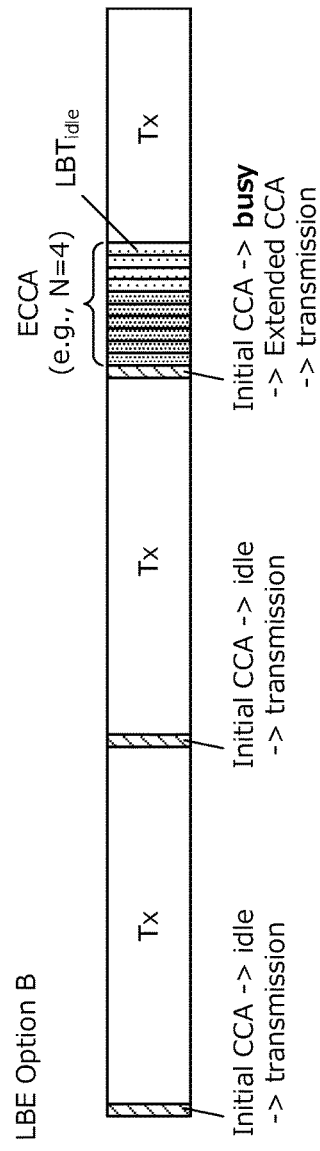
FIG. 1A
FIG. 1B

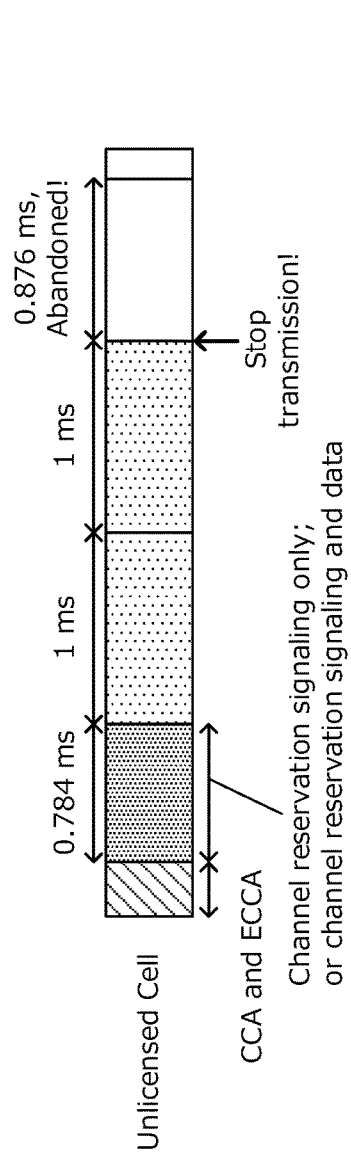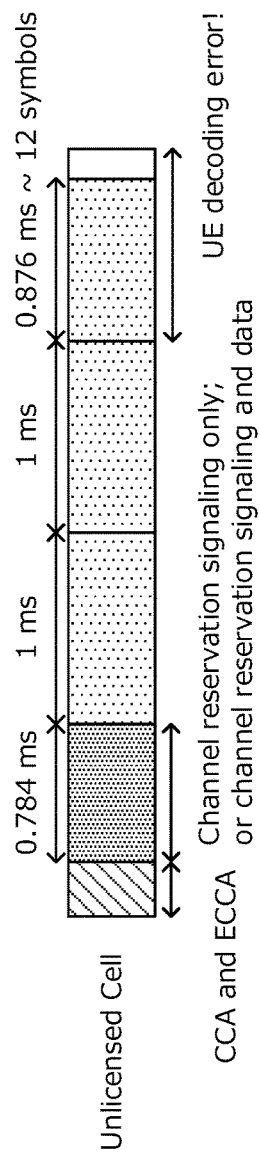
FIG. 5A
FIG. 5B

FIG. 7A

| Index | 0 | 1 |
|---|---|---|
| Symbol number | 14 (Normal subframe) | 7 (Fractional subframe) |

FIG. 7B

| Index | 0 | 1 | 2 | 3 |
|---|---|---|---|---|
| Symbol number | 7 | 9 | 12 | 14 |

FIG. 7C

| Index | 0 | 1 | 2 | 3 | 4 | 5 | 6 | 7 |
|---|---|---|---|---|---|---|---|---|
| Symbol number | 14 | 12 | 11 | 10 | 9 | 7 | 6 | 5 |

FIG. 10A

| 3 new bits | N |
|---|---|
| 000 | 7 |
| 001 | 8 |
| ... | ... |
| 111 | 14 |

FIG. 10B

| 2 new bits | Index |
|---|---|
| 00 | 0 |
| 01 | 1 |
| 10 | 2 |
| 11 | 3 |

FIG. 10C

| 1 new bits | Information |
|---|---|
| 0 | Normal subframe |
| 1 | Fractional subframe |

FIG. 10D

| 4 new bits | q |
|---|---|
| 0000 | 4 |
| 0001 | 5 |
| ... | ... |
| 1111 | reserved |

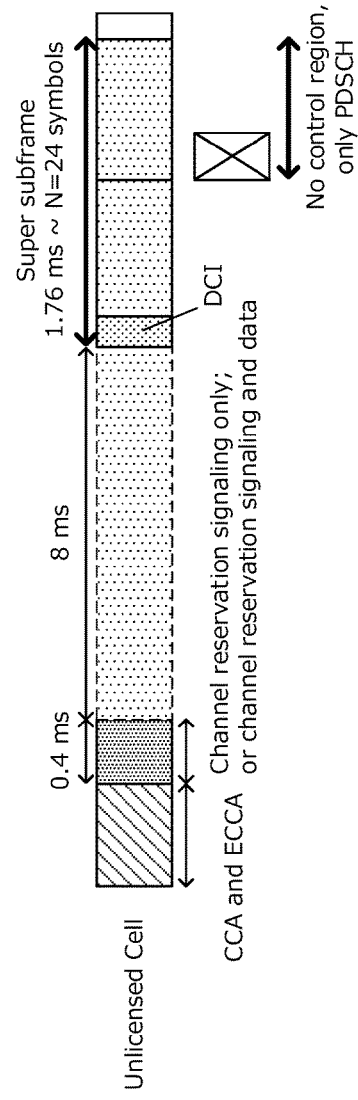

RADIO BASE STATION, USER TERMINAL, RADIO COMMUNICATION SYSTEM AND RADIO COMMUNICATION METHOD

TECHNICAL FIELD

The present invention relates to a radio base station, a user terminal, a radio communication system and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower delays and so on (see non-patent literature 1). The specifications of LTE-advanced have been drafted for the purpose of achieving further broadbandization and higher speeds beyond LTE, and, in addition, for example, a successor system of LTE—referred to as "FRA" (Future Radio Access)—is under study.

In LTE of Rel. 8 to 12, the specifications have been drafted assuming exclusive operations in frequency bands that are licensed to operators—that is, licensed bands. For licensed bands, for example, 800 MHz, 2 GHz and/or 1.7 GHz have been in use.

LTE of Rel. 13 and later versions targets also on operations in frequency bands where license is not required—that is, unlicensed bands. For unlicensed bands, for example, 2.4 GHz, which is the same as in Wi-Fi, or the 5 GHz band and/or the like may be used. Although carrier aggregation between licensed bands and unlicensed bands (LAA: license-assisted access) is under study in Rel. 13 LTE, there is a possibility that, in the future, dual connectivity and unlicensed-band stand-alone may be studied as well.

In unlicensed bands, interference control functionality is likely to be necessary in order to allow co-presence with other operators' LTE, Wi-Fi, or different systems. In Wi-Fi, the function called "LBT" (Listen Before Talk) or "CCA" (Clear Channel Assessment) is implemented as an interference control function. In Japan and Europe, the LBT function is stipulated as mandatory in systems that are run in the 5 GHz unlicensed band, such as Wi-Fi.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall Description; Stage 2"

SUMMARY OF INVENTION

Technical Problem

In a radio communication system (LAA) that runs LTE in unlicensed bands, cases might occur where the timings data transmission starts and ends change depending on the result of LBT and the burst length that is allowed. These timings do not necessarily meet subframe boundaries, and therefore it is not possible to allocate or transmit resources in one-subframe units as has been done heretofore. Assuming such cases, it is necessary to set forth a method of making maximum use of resources while preventing demodulation errors in user terminals.

The present invention has been made in view of the above, and it is therefore an object of the present invention to provide a radio base station, a user terminal, a radio communication system and a radio communication method, whereby, even if the maximum possible burst length of transmission is carried out after LBT, it is still possible to prevent demodulation errors in user terminals, and, furthermore, implement an LAA system that yields high spectral efficiency.

Solution to Problem

According to one example of the present invention, a user terminal has a receiving section that receives information about the number of symbols used in a given subframe of a carrier where LBT (Listen Before Talk) is configured, in the carrier, and a control section that controls a receiving process in the given subframe based on the information about the number of symbols used.

Advantageous Effects of Invention

According to the present invention, even if the maximum possible burst length of transmission is carried out after LBT, it is still possible to prevent demodulation errors in user terminal, and, furthermore, implement an LAA system that yields high spectral efficiency.

BRIEF DESCRIPTION OF DRAWINGS

FIG. 1 provide diagrams to explain LBT, which is an LBT mechanism;

FIG. 5 provide diagrams to explain patterns that may be possible based on existing LTE transmission;

FIG. 7 provide diagrams to explain a second example;

FIG. 10 provide diagrams to explain L1 signaling according to the present embodiment;

FIG. 11 provide diagrams to explain a super subframe according to the present embodiment;

DESCRIPTION OF EMBODIMENTS

Figure 2:
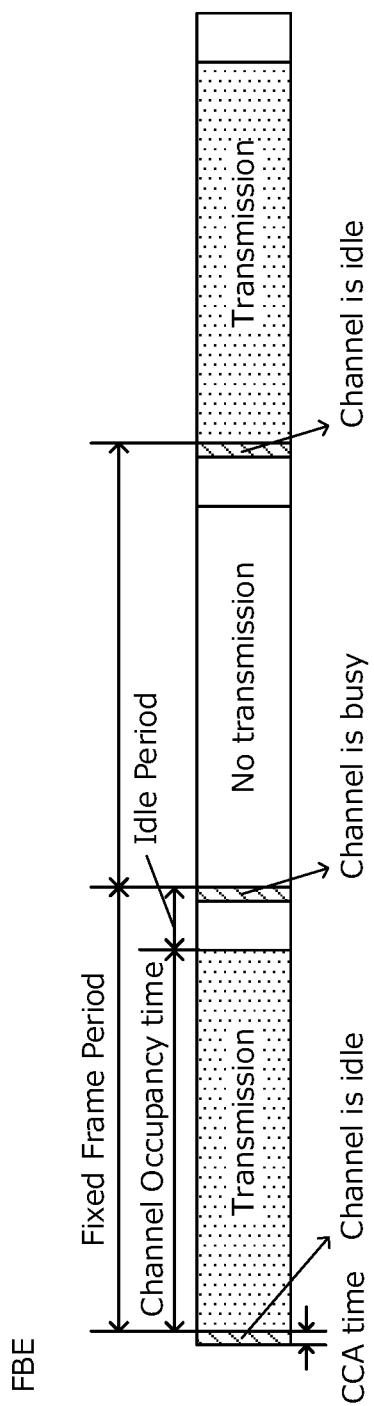
FIG. 2 is a diagram to explain FBE, which is an LBT mechanism.

Now, an embodiment of the present invention will be described in detail below with reference to the accompanying drawings. Although the present embodiment will be described assuming that a frequency carrier in which LBT is not configured is a licensed band and a frequency carrier in which LBT is configured is an unlicensed band, this is by no means limiting. That is, the present embodiment is applicable to any frequency carrier in which LBT is configured, regardless of whether this is a licensed band or an unlicensed band.

In a radio communication system (LAA) that runs LTE in unlicensed bands, it is sometimes the case that LBT operation is obligatory. For example, in Japan and Europe, LBT operation is required before transmission is started in an unlicensed band. Here, if the received signal intensity in the LBT period is higher than a predetermined threshold, the channel is judged to be in the busy state ($LBT_{busy}$). If the received signal intensity in the LBT period is lower than the predetermined threshold, the channel is judged to be in the idle state ($LBT_{idle}$).

Now, LBE (Load-Based Equipment) and FBE (Frame-Based Equipment), which are LBT mechanisms, will be described.

With LBE, initial CCA is executed, and transmission is started if $LBT_{idle}$ is yielded, or the ECCA (Extended CCA) procedure is executed if $LBT_{busy}$ is yielded.

In LBE option A (see FIG. 1A), if $LBT_{idle}$ is confirmed N times in q times of carrier sensing during the ECCA procedure, transmission is started. The value N is selected randomly, from the range of 1 to q, per ECCA procedure. In this case, if the channel is judged to be in use ($LBT_{busy}$) over a number of times of consecutive carrier sensing, this is counted as one. If $LBT_{idle}$ cannot be confirmed N times in q times of carrier sensing, the ECCA procedure moves on to the next ECCA procedure. In this case, the counter is reset, and the value of q is increased. For example, the initial value of q is 16, and multiplies per ECCA. The value N is selected again, randomly, from the range of 1 to q. If transmission succeeds through ECCA procedures, or if q reaches a predetermined maximum value, the value of q returns to its initial value.

Referring to the example shown in FIG. 1A, the first ECCA procedure holds q=16 and N=15, so that the condition for starting transmission is that $LBT_{idle}$ be confirmed 15 times in 16 times of carrier sensing. However, in the example shown in FIG. 1A, the number of times $LBT_{idle}$ is confirmed in the first ECCA procedure is less than 15, so that the first ECCA procedure moves on to a second ECCA procedure. The second ECCA procedure holds q=32 and N=8, so that the condition for starting transmission is that $LBT_{idle}$ be confirmed 8 times in 32 times of carrier sensing. In the example shown in FIG. 1A, the number of times $LBT_{idle}$ is confirmed during the second ECCA procedure is 8 or greater, so that transmission is started.

In LBE option B (see FIG. 1B), when the ECCA procedure is executed, CCA is executed repeatedly until $LBT_{idle}$ is confirmed N times. The value N is selected randomly from the range of 1 to q, per ECCA procedure. FIG. 1B shows a case where N=4, and where, in an ECCA procedure, transmission is started after $LBT_{idle}$ is confirmed four times.

In FBE, carrier sensing is executed in fixed timings and in a fixed cycle, starting transmission if $LBT_{idle}$ is yielded, or waiting until the carrier sensing timing arrives if $LBT_{busy}$ is yielded. As shown in FIG. 2, if the timings to execute carrier sensing are provided at the end of specific subframes, the timing to start a burst always meets a subframe boundary.

Figure 3:
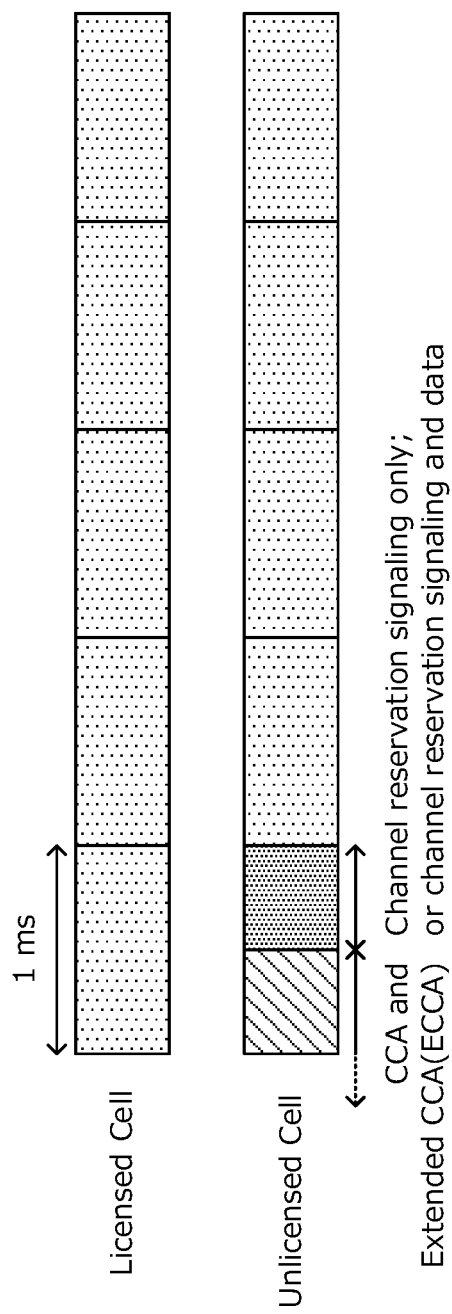
FIG. 3 is a diagram to explain subframe boundaries in a licensed band and an unlicensed band.

The following description will presume LBE as the LBT mechanism to apply. In LBE, CCA is executed in short time units on the order of several tens of μs, and transmission is started when a channel is available. LAA presumes carrier aggregation with licensed band, so that timings like subframe boundaries and symbol boundaries are synchronized between unlicensed band and licensed bands. So, cases occur where the timings CCA succeeds in unlicensed bands do not meet subframe boundaries or symbol boundaries. Even if CCA or ECCA succeeds, LTE data signals cannot be transmitted in a period shorter than an OFDM symbol, and therefore, even after CCA succeeds, other signals such as channel reservation signals have to be transmitted until the next OFDM symbol boundary arrives (see FIG. 3). If there are multiple OFDM symbols before the next subframe boundary, technically, it is possible to transmit data in these OFDM symbols.

In LBE, the timing burst transmission ends changes depending on the timing the transmission starts and the maximum possible burst length. The maximum possible burst length in LBE is determined by, for example, parameter q in CCA, and, in LBT option B in EN 301 893 v.1.8.0, the maximum possible burst length is stipulated to be ($^{13}/_{32}$)×q [ms].

Figure 4:
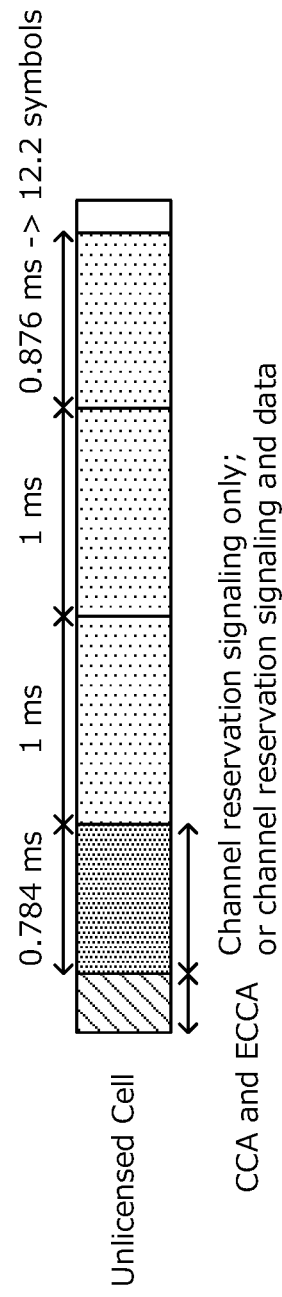
FIG. 4 is a diagram to explain the maximum possible burst length in LBE.

As shown in FIG. 4, when parameter q=9 is used, the maximum possible burst length is determined to be 3.66 [ms]. After CCA or ECCA succeeds, channel reservation signals and others are transmitted for 0.784 [ms], until the next OFDM symbol boundary. The timing the burst transmission ends is 0.876 [ms] (12.2 symbols) from a subframe boundary. Consequently, if an attempt is made to make the most use of the possible burst length, data transmission might end at a timing that does not meet a subframe boundary.

By contrast with this, in accordance with existing LTE transmission, it may be possible to stop transmission at a subframe boundary (see FIG. 5A). This, however, is a case to yield poor efficiency because it is not make full use of the maximum possible burst length. In the example shown in FIG. 5A, resources for 0.876 [ms] are abandoned as a result of stopping transmission at a subframe boundary.

Alternatively, it may also be possible to stop burst transmission at an arbitrary timing (see FIG. 5B). However, unless some assist is given to a user terminal, the user terminal has to carry out demodulation in the ending subframe without even knowing when data transmission is going to stop, and a demodulation error is likely to occur. In the example shown in FIG. 5B, burst transmission stops in the twelfth symbol of the ending subframe, but, if a user terminal does not know this, the user terminal performs demodulation assuming that data is present up to the last symbol of the subframe, and this leads to an error. Consequently, to stop burst transmission at an arbitrary timing, information about the number of data symbols used in this subframe or information about the rate matching pattern needs to be reported to the user terminal.

In this way, the timings data transmission starts and ends change depending on the result of LBT and the burst length that is allowed, and these timings do not necessarily meet subframe boundaries, and therefore how to carry out data transmission is the problem.

In view of the above, and in order to make maximum use of resources in every transmission opportunity, the present inventors have come up with a configuration for eliminating demodulation errors in user terminals and for carrying out data transmission by using only part of the OFDM symbols in a subframe. By this means, even if the maximum possible burst length of transmission is carried out after LBT, it is still possible to prevent demodulation errors in user terminals, and, furthermore, implement an LAA system that yields high spectral efficiency. Note that a subframe in which data transmission is carried out using only part of the OFDM symbols will be hereinafter referred to as a "fractional subframe."

FIRST EXAMPLE

With a first example, a radio base station reports the number "N" of symbols used in the ending subframe, which is a fractional subframe, to a user terminal, via L1 signaling.

Figure 6:
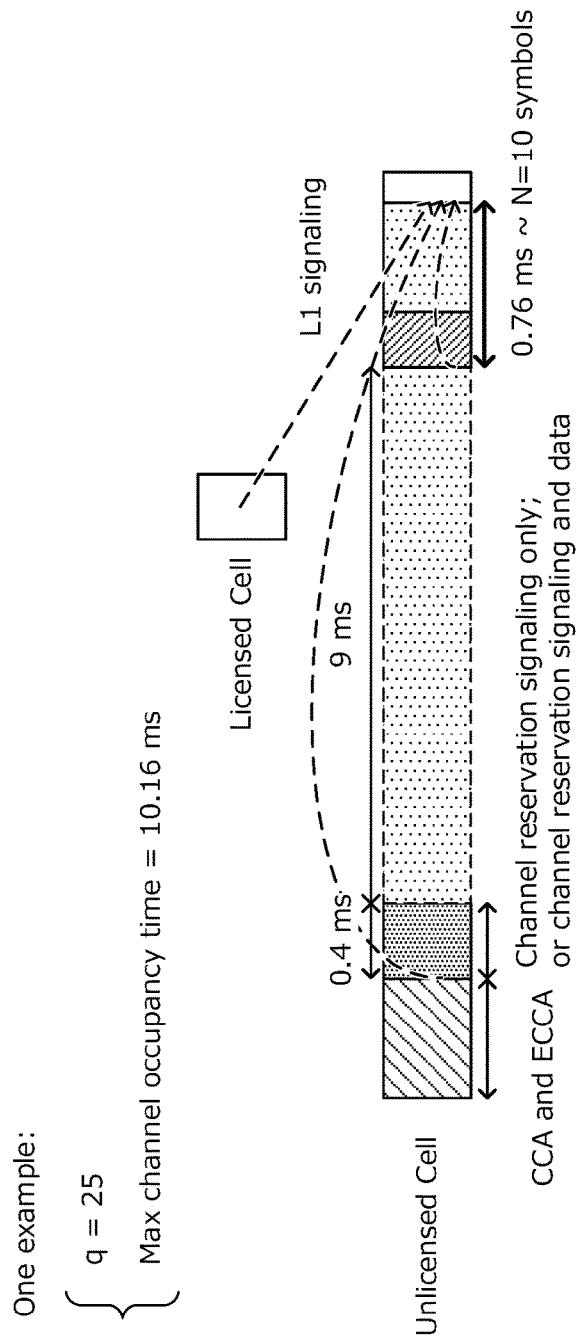
FIG. 6 is a diagram to explain a first example.

The number of symbols used, N, is determined by the radio base station to be an integer value within a range not exceeding the maximum possible burst length. In the example shown in FIG. 6, parameter q=25 holds, so that the maximum possible burst length is determined to be 10.16 [ms]. After CCA or ECCA succeeds, channel reservation signals and others are transmitted for 0.4 [ms] until the next OFDM symbol boundary arrives. The timing the burst transmission ends is 0.76 [ms] from a subframe boundary. The radio base station determines that the number of symbols used in the ending subframe is N=10.

The radio base station reports the number of symbols used in the ending subframe, N, to the user terminal, via L1 signaling. L1 signaling may be reported in DCI (Downlink Control Information) of a licensed cell or an unlicensed cell, or may be reported in the channel reservation signal, which is transmitted at the beginning of a burst (overhead portion).

Also, the radio base station determines whether or not to transmit data in the ending subframe. For example, if the number of symbols used in the ending subframe, N, is large enough, the radio base station determines to carry out data transmission in the ending subframe. If the number of symbols used in the ending subframe, N, is relatively small, the radio base station determines not to carry out data transmission in the ending subframe, and to stop transmission at the nearest preceding subframe boundary.

SECOND EXAMPLE

With a second example, a radio base station reports the relationships between the patterns of the number, N, of symbols used in the ending subframe, which is a fractional subframe, and indices, to a user terminal in advance, via RRC (Radio Resource Control) signaling, and, furthermore, reports indices to the user terminal via L1 signaling.

FIG. 7 show the relationships between the patterns of the number of symbols used in the ending subframe, N, and indices. FIG. 7A shows an example case where the number of statuses is 2. When the number of statuses is 4, for example, these relationships are defined as shown in FIG. 7B (linear or non-linear), and, when the number of statuses is 8, for example, these relationships are defined as shown in FIG. 7C (linear or non-linear).

If there are not enough indices to meet all the patterns of the numbers of symbols, it is possible to make the number of L1 signaling bits less than in the first example.

As for the method of reporting indices via L1 signaling, similar to the first example, it is possible to apply methods to use the PDCCH/EPDCCH (Physical Downlink Control Channel/Enhanced PDCCH), or apply the method of sending reports in channel reservation signals. The transmission methods to use the PDCCH/EPDCCH may include the method of transmitting in the same subframe in the same carrier (unlicensed carrier) as the target subframe, the method of transmitting in the same subframe, in a different carrier from the target subframe (cross carrier scheduling), and the method of transmitting in a different subframe from that of the target subframe (cross-subframe/multi-subframe scheduling).

THIRD EXAMPLE

Figure 8:
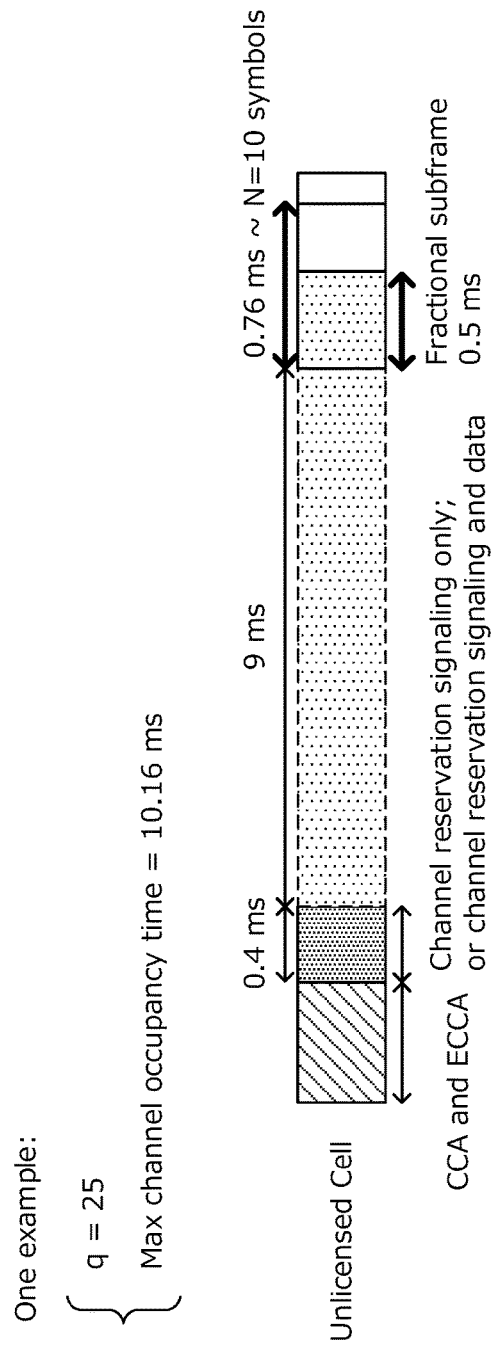
FIG. 8 is a diagram to explain a third example.

With a third example, a fractional subframe will be newly defined. A fractional subframe is stipulated, for example, as a subframe in which transmission is carried out using the half—0.5 [ms]—of the subframe (one slot) (see FIG. 8).

A radio base station reports to the user terminal whether the target subframe is a normal subframe or a fractional subframe, via one bit of L1 signaling. Alternatively, without any reports sent from the radio base station, the user terminal may assume the case of a normal subframe and the case of fractional subframe, and execute blind demodulation with respect to both patterns.

The Third example is similar to the case in the second example where the number of statuses is 2, in that whether the ending subframe is a normal subframe or a fractional subframe is reported via one-bit L1 signaling.

FOURTH EXAMPLE

In a fourth example, a user terminal autonomously calculates the number, N, of symbols used in the ending subframe, which is a fractional subframe, based on LBT rules and parameters that are reported or configured in advance.

To allow a user terminal to autonomously calculate the number of symbols used, N, various methods may be used, including, for example, setting forth rules in the specification that allow the user terminal to know the LBT parameter q without having it reported, reporting the LBT parameter q to the user terminal, in advance, via RRC signaling, and reporting the LBT parameter q to the user terminal via dynamic signaling.

If the maximum possible burst length is determined by the value of parameter q, the terminal can detect the beginning of a burst from a channel reservation signal, and, assuming that transmission will be carried out for the maximum possible burst length from there, calculate the number of symbols used in the ending subframe, N. Note that, in LBT option B of EN 301 893 v.1.8.0, the maximum possible burst length is stipulated as $(13/32) \times q$ [ms].

Figure 9:
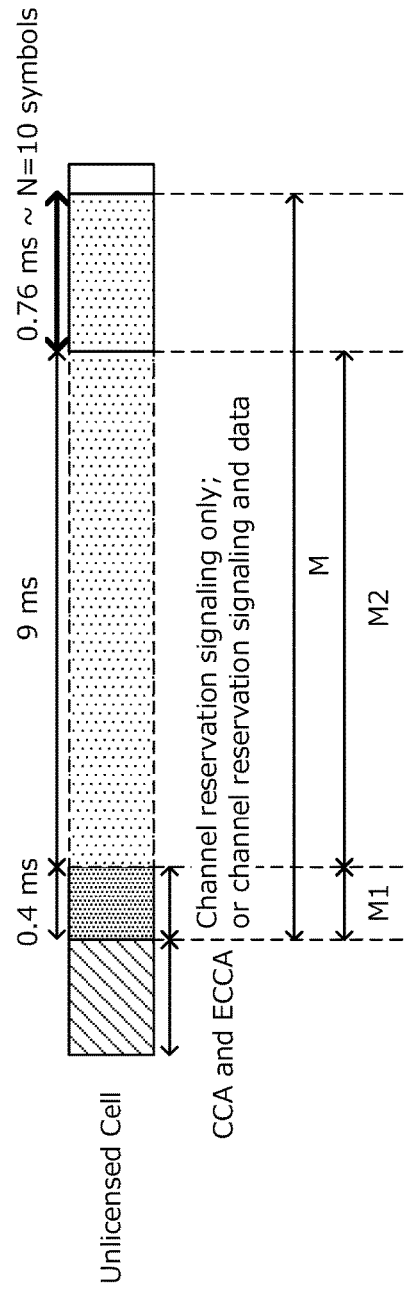
FIG. 9 is a diagram to explain a fourth example.

Referring to the example illustrated in FIG. 9, when parameter q=25 is detected or reported, the user terminal calculates the maximum possible burst length M (=10.16 [ms]). The terminal detects the beginning of a burst from a channel reservation signal, and makes a record of transmission time M1 (=0.4 [ms]) in the same subframe as CCA or ECCA. Following this, the user terminal makes a record of transmission time M2 (=9 [ms]), which is given in an integer, in the subsequent part of the subframe. By this means, the user terminal can calculate the location and length of the fractional subframe at the end of the burst (M−M1−M2=0.76 [ms]).

(Design of L1 Signaling)

Now, the design of L1 signaling, which is used in the first example to the fourth example to report the number, N, of symbols used in the ending subframe, which is a fractional subframe, will be described in detail.

First, DCI can be used as L1 signaling like this. To report the number of symbols used, N, to each user terminal separately, DCI that is transmitted in user terminal-specific search spaces can be used. For example, it is possible to use the CIF (Carrier Indicator Field) and the PQI (PDSCH remapping and Quasi-co-location Indicator) in DCI, or set forth a DCI format in which new bits are added.

To report the number of symbols used, N, to a plurality of user terminals together, DCI that is transmitted in the common search space can be used. For example, it is possible to introduce a new RNTI (Radio Network Temporary Identifier), and use DCI formats 1A/1C/3/3A scrambled therewith.

FIG. 10A shows an example of relationships between newly-defined three bits and the number of symbols used in the ending subframe, N, which is reported via L1 signaling in the first example.

FIG. 10B shows examples of relationships between newly-defined two bits, and indices, which are reported via L1 signaling in the second example. As noted earlier, the number of symbols used in the ending subframe, N, corresponding to each index, is reported via RRC signaling.

FIG. 10C shows examples of relationships between newly-defined one bit and subframe information, which is reported via L1 signaling in the third example.

FIG. 10D shows examples of relationships between newly-defined four bits and parameter q, which is reported via L1 signaling in the fourth example.

When DCI is transmitted from a licensed cell, it is possible to report the target component carrier's index together. When cross-subframe or multi-subframe scheduling is used, it is possible to report the target subframe's index or offset from the scheduling subframe together.

Second, for L1 signaling like this, channel reservation signals or new signals to be transmitted in the starting subframe in a burst can be used. The information about the number of symbols used, N, may be placed as modulation data on a signal that is transmitted, or may be linked with the signal sequence pattern that is transmitted in the starting subframe.

In the first example, the channel reservation signal may indicate the number of symbols used in a fractional subframe, N, and the location of the fractional subframe—for example, the offset from the normal subframe.

In the second example, the channel reservation signal may indicate the index of the number of symbols used in a fractional subframe, N, and the location of the fractional subframe—for example, the offset from the normal subframe.

In the third example, the channel reservation signal may indicate the presence of a fractional subframe, and, if a fractional subframe is present, the location of the fractional subframe—for example, the offset from the normal subframe.

In the fourth example, the channel reservation signal may represent the value of parameter q.

According to the first example to the fourth example, the resource that can be used in the maximum possible burst length can be maximized by supporting transmission in fractional subframes. In this case, by reporting the number, N, of symbols used in the ending fractional subframe in burst transmission and the location of the fractional subframe to a user terminal, it becomes possible to prevent demodulation errors in the user terminal.

(Variation 1)

The ending subframe (fractional subframe) in a burst and its nearest preceding subframe may be collectively referred to as a "super subframe" (see FIG. 11A). In this case, the two subframes (one super subframe) are granted together in one DCI. For example, in accordance with the above first example, the number of symbols used in the super subframe, N, is reported in L1 signaling.

In the example shown in FIG. 11A, given that parameter q=25, the maximum possible burst length is determined to be 10.16 [ms]. After CCA or ECCA succeeds, channel reservation signals and others are transmitted for 0.4 [ms], until the next OFDM symbol boundary arrives. The length of super subframe is 1.76 [ms]. The radio base station reports the length of the super subframe to the user terminal via L1 signaling. In the example shown in FIG. 11A, the length of the super subframe is reported in one DCI. The user terminal learns the length of the super subframe by using one of the methods of the first example to the fourth example, and then demodulates the super subframe. In the super subframe, the fractional subframe portion has no control region, and only the data region is present.

When the super subframe is used, the control region of the ending subframe (fractional subframe) is not necessary, so that the spectral efficiency improves. Also, since the pattern of the numbers of symbols used, N, does not change in the ending subframe, the number of bits required for reporting does not increase compared to the case the super subframe is not used. FIG. 11B shows the same table as that of FIG. 7B, showing the relationships between the numbers of symbols used in a fractional subframe, N, when the number of statuses is defined to be 4, and indices, in accordance with the second example. FIG. 11C shows the relationships between the numbers of symbols used in a fractional subframe, N, when the number of statuses is defined to be 4, and indices. Thus, the pattern of the numbers of symbols in the ending subframe does not change, so that the number of bits required for reporting does not vary between FIG. 11B and FIG. 11C.

(Variation 2)

The first example to the third example can be used as methods of reporting the number of symbols in the starting subframe in burst transmission. In this case, the PDCCH of the same subframe cannot be used for L1 signaling for reporting the number of symbols. So, as other possible methods, L1 signaling may be sent in a subsequent subframe (the first normal subframe), may be sent in the channel reservation signal, or may be sent in the EPDCCH of the same subframe, or a new control signal field/format for the top fractional subframe may be set forth.

Figure 12:
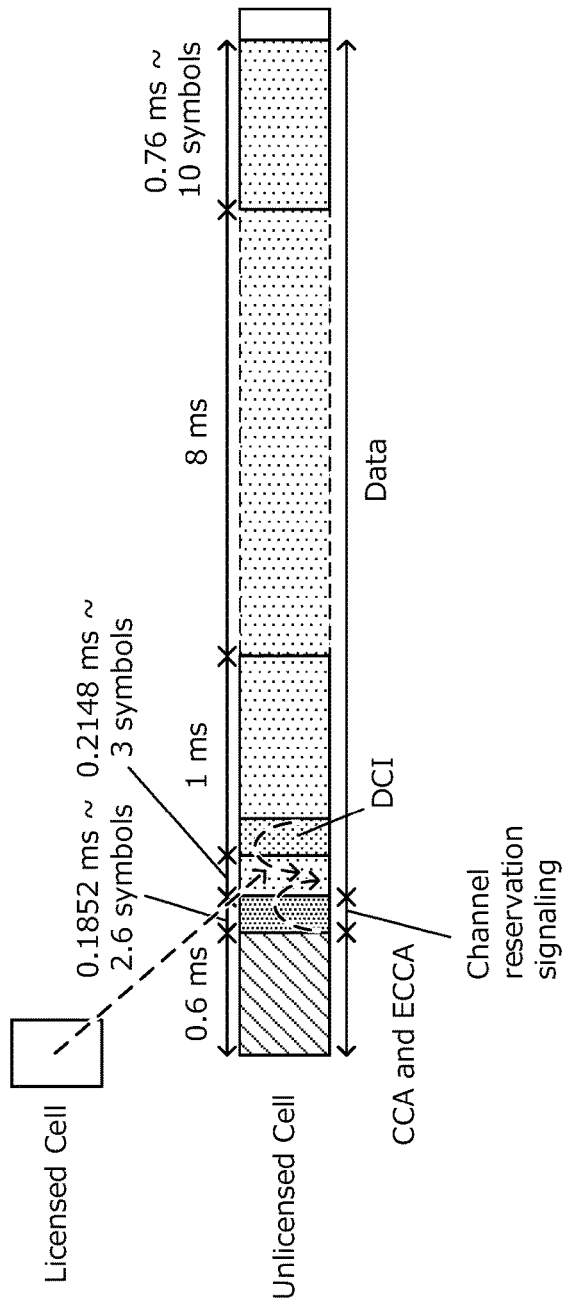
FIG. 12 is a diagram to explain a method of reporting the number of symbols in the starting subframe in burst transmission, according to the present embodiment.

In the example shown in FIG. 12, given that parameter q=25, the maximum possible burst length is determined to be 10.16 [ms]. In the period of 0.4 [ms] (5.6 symbols) from successful CCA or ECCA to the next OFDM symbol boundary, three symbols are used for data transmission. In the methods shown in FIG. 12, this number of symbols is reported by using a licensed cell's DCI (cross-component carrier), reported by using the channel reservation signal, or reported by using the DCI of the first normal subframe (cross-subframe).

Alternatively, in accordance with the fourth example, a user terminal can autonomously calculate the number of symbols in the starting subframe in burst transmission. In this case, the user terminal calculates how many data symbols are present from the timing a channel reservation signal is detected up to the subsequent subframe boundary, from predetermined rules and so on. The predetermined rules provide, for example, that the length of the channel reservation signal be maximum x.

Figure 13:
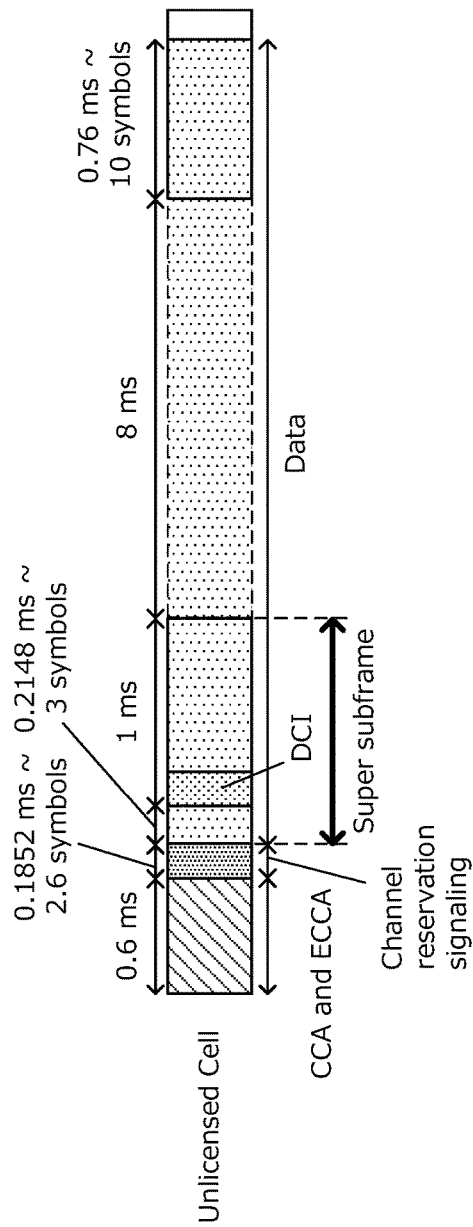
FIG. 13 is a diagram to explain a method of reporting the number of symbols in the starting subframe in burst transmission, according to the present embodiment.

The concept of a super subframe may be applied to the starting subframe. That is, it is possible see the starting subframe and the immediately following, the first normal subframe together as a super subframe (see FIG. 13). In this case, the length of the super subframe (17 symbols in FIG. 13) is reported in DCI by using one of the methods of the first example to the third example. In the example shown in FIG. 13, the two subframes (one super subframe) are granted together in the DCI (licensed carrier or unlicensed carrier) of the first normal subframe, which is the second subframe in a burst.

(Variation 3)

To report both the starting subframe and the ending subframe, in which the timing data transmission starts and the timing data transmission ends come in the middle of the subframe, as fractional subframes, at the same time, different DCIs may be used for the starting subframe and the ending subframe. In this case, whether the number of symbols reported is the number of symbols used in the starting subframe in which data transmission starts from the middle or the number of symbols used in the ending subframe in which data transmission ends in the middle may be reported together. Alternatively, each fractional subframe's location and its offset with respect to the normal subframe may be reported.

Figures 14A, 14B:
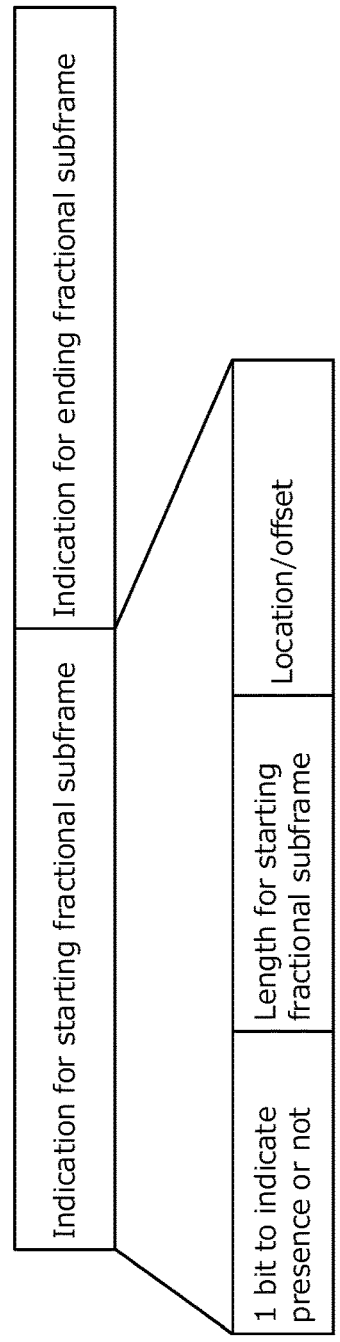
FIG. 14 provide diagrams to explain examples of DCI contents and formats according to the present embodiment.

FIG. 14A shows examples of the above DCI's contents and format. This DCI contains information to represent an indication as to whether the fractional subframe is the starting subframe or the ending subframe, the length of the fractional subframe or an index to represent this length, and the location of the fractional subframe or its offset.

Alternatively, to report both the starting subframe and the ending subframe, in which the timing data transmission starts and the timing data transmission ends come in the middle of the subframe, as fractional subframes, at the same time, one DCI may be used for both subframes. In this case, whether the fractional subframe is the starting subframe or the ending subframe, or both, may be reported together. Alternatively, the location of each fractional subframe, or its offset with respect to the normal subframe, may be reported.

FIG. 14B shows examples of the above DCI's contents and format. This DCI may include indications for the starting fractional subframe and the ending fractional subframe. The indication for the starting fractional subframe contains information that represents one bit indicating whether the starting fractional subframe is present, the length of the starting fractional subframe, and the location or the offset of the starting fractional subframe. Although not illustrated, the indication for the ending fractional subframe likewise contains information that represents one bit indicating whether the ending fractional subframe is present, the length of the ending fractional subframe, and the location or the offset of the ending fractional subframe.

Although LBE has been presumed as the LBT mechanism to apply in the above description, in FBE, too, reporting the number of symbols used in fractional subframes, N, is effective. In unlicensed bands, the spectral efficiency improves as a result of not making unnecessary transmission and letting other systems use channels, so that, in FBE, too, it may be possible to change the number of symbols to use in the ending subframe in burst transmission. In this case, the methods of the first example to the fourth example can be used in FBE as well.

(Structure of Radio Communication System)

Now, the structure of the radio communication system according to the present embodiment will be described below. In this radio communication system, a radio communication method to carry out the above-described fractional subframe transmission is employed.

Figure 15:
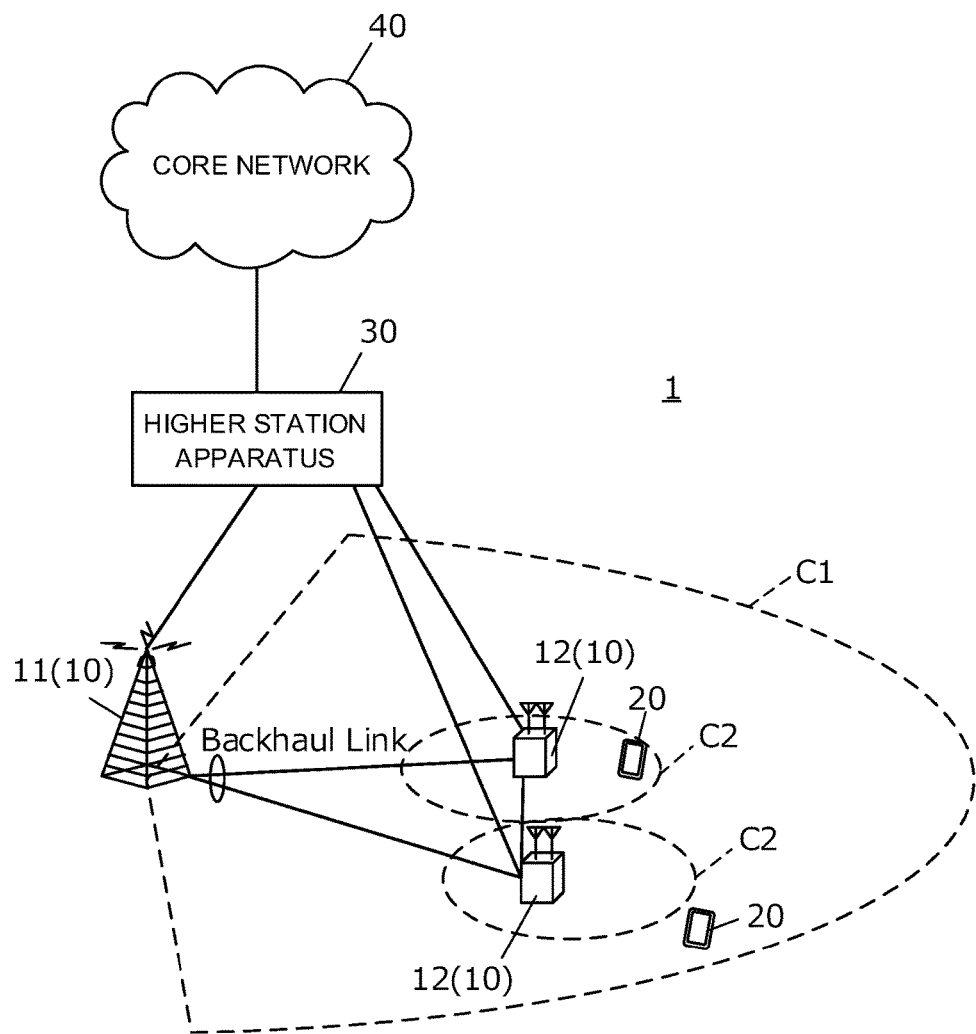
FIG. 15 is a diagram to show an example of a schematic structure of a radio communication system according to the present embodiment.

FIG. 15 is a diagram to show an example of a schematic structure of a radio communication system according to the present embodiment; This radio communication system can adopt one or both of carrier aggregation and dual connectivity to group a plurality of fundamental frequency blocks (component carriers) into one, where the LTE system bandwidth constitutes one unit. Also, this radio communication system provides a radio base station that can use unlicensed bands.

As shown in FIG. 15, a radio communication system 1 is comprised of a plurality of radio base stations 10 (11 and 12), and a plurality of user terminals 20 that are present within cells formed by each radio base station 10 and that are configured to be capable of communicating with each radio base station 10. The radio base stations 10 are each connected with a higher station apparatus 30, and are connected to a core network 40 via the higher station apparatus 30.

In FIG. 15, the radio base station 11 is, for example, a macro base station having a relatively wide coverage, and forms a macro cell C1. The radio base stations 12 are, for example, small base stations having local coverages, and form small cells C2. Note that the number of radio base stations 11 and 12 is not limited to that shown in FIG. 15.

For example, a mode may be possible in which the macro cell C1 is used in a licensed band and the small cells C2 are used in unlicensed bands. Also, a mode may be also possible in which part of the small cells C2 is used in a licensed band and the rest of the small cells C2 are used in unlicensed bands. The radio base stations 11 and 12 are connected with each other via an inter-base station interface (for example, optical fiber, the X2 interface, etc.).

The user terminals 20 can connect with both the radio base station 11 and the radio base stations 12. The user terminals 20 may use the macro cell C1 and the small cells C2, which use different frequencies, at the same time, by way of carrier aggregation or dual connectivity. For example, it is possible to transmit assist information (for example, the downlink signal configuration) related to a radio base station 12 that uses an unlicensed band, from the radio base station 11 that uses a licensed band, to the user terminals 20. Also, a structure may be employed here in which, when carrier aggregation is used between a licensed band and an unlicensed band, one radio base station (for example, the radio base station 11) controls the scheduling of licensed band cells and unlicensed band cells.

The user terminals 20 may be structured to connect with radio base stations 12, without connecting with the radio base station 11. For example, a radio base station 12 to use an unlicensed band may be structured to connect with a user terminal 20 in stand-alone. In this case, the radio base station 12 controls the scheduling of unlicensed band cells.

The higher station apparatus 30 may be, for example, an access gateway apparatus, a radio network controller (RNC), a mobility management entity (MME) and so on, but is by no means limited to these.

In the radio communication system 1, a downlink shared channel (PDSCH: Physical Downlink Shared CHannel), which is used by each user terminal 20 on a shared basis, a downlink control channel (PDCCH: Physical Downlink Control CHannel), EPDCCH (Enhanced Physical Downlink Control CHannel), etc.), a broadcast channel (PBCH) and so on are used as downlink channels. User data, higher layer control information and predetermined SIBs (System Information Blocks) are communicated in the PDSCH. Downlink control information (DCI) is communicated using the PDCCH and/or the EPDCCH.

Also, in the radio communication system 1, an uplink shared channel (PUSCH: Physical Uplink Shared Channel), which is used by each user terminal 20 on a shared basis, and an uplink control channel (PUCCH: Physical Uplink Control Channel) are used as uplink channels. User data and higher layer control information are communicated by the PUSCH.

Figure 16:
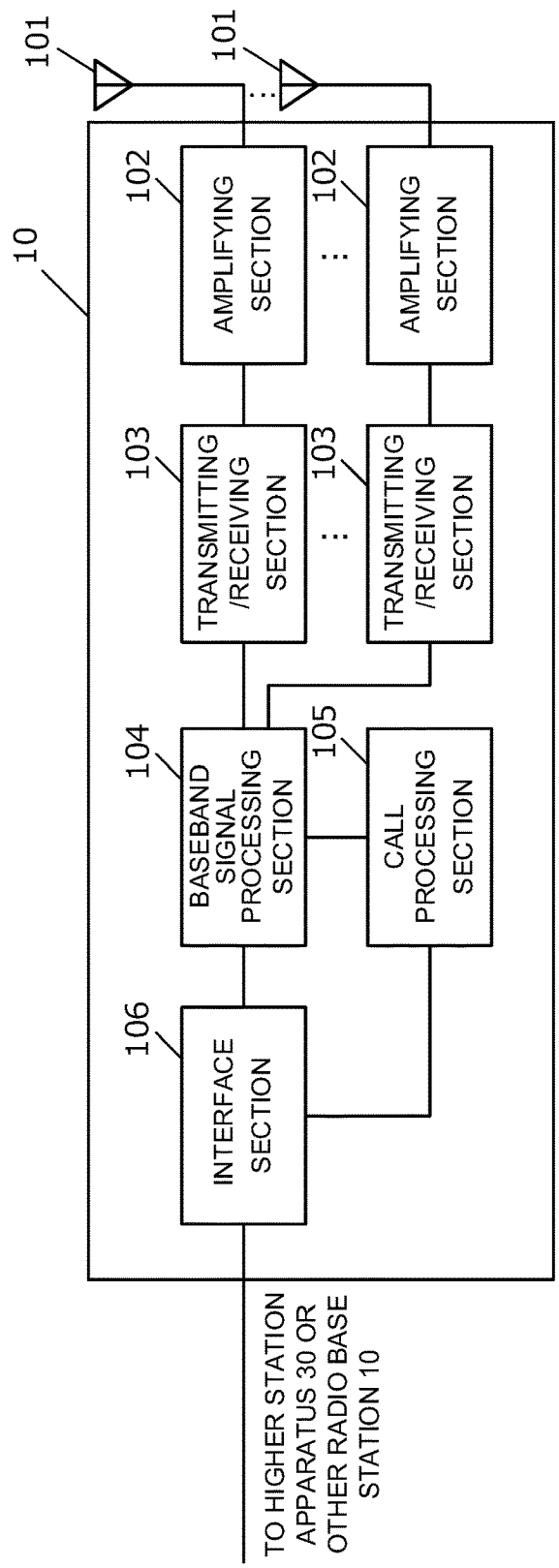
FIG. 16 is a diagram to show an example of an overall structure of a radio base station according to the present embodiment.

FIG. 16 is a diagram to show an overall structure of a radio base station 10 according to the present embodiment. As shown in FIG. 16, the radio base station 10 has a plurality of transmitting/receiving antennas 101 for MIMO (Multiple-Input and Multiple-Output) communication, amplifying sections 102, transmitting/receiving sections (transmitting sections and receiving sections) 103, a baseband signal processing section 104, a call processing section 105 and an interface section 106.

User data to be transmitted from the radio base station 10 to a user terminal 20 on the downlink is input from the higher station apparatus 30, into the baseband signal processing section 104, via the interface section 106.

In the baseband signal processing section 104, the user data is subjected to a PDCP (Packet Data Convergence Protocol) layer process, user data division and coupling, RLC (Radio Link Control) layer transmission processes such as an RLC retransmission control transmission process, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Each transmitting/receiving section 103 converts the downlink signals, pre-coded and output from the baseband signal processing section 104 on a per antenna basis, into a radio frequency band. The amplifying sections 102 amplify the radio frequency signals having been subjected to frequency conversion, and transmit the signals through the transmitting/receiving antennas 101. For the transmitting/receiving sections 103, transmitters/receivers, transmitting/receiving circuits or transmitting/receiving devices that can be described based on common understanding of the technical field to which the present invention pertains can be used.

Each transmitting/receiving section 103 transmits information about fractional subframe transmission or super subframe transmission to the user terminals 20.

As for uplink signals, radio frequency signals that are received in the transmitting/receiving antennas 101 are each amplified in the amplifying sections 102, converted into baseband signals through frequency conversion in each transmitting/receiving section 103, and input into the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the interface section 106. The call processing section 105 performs call processing such as setting up and releasing communication channels, manages the state of the radio base station 10 and manages the radio resources.

The interface section 106 transmits and receives signals to and from neighboring radio base stations (backhaul signaling) via an inter-base station interface (for example, optical fiber, the X2 interface, etc.). Alternatively, the interface section 106 transmits and receives signals to and from the higher station apparatus 30 via a predetermined interface.

Figure 17:
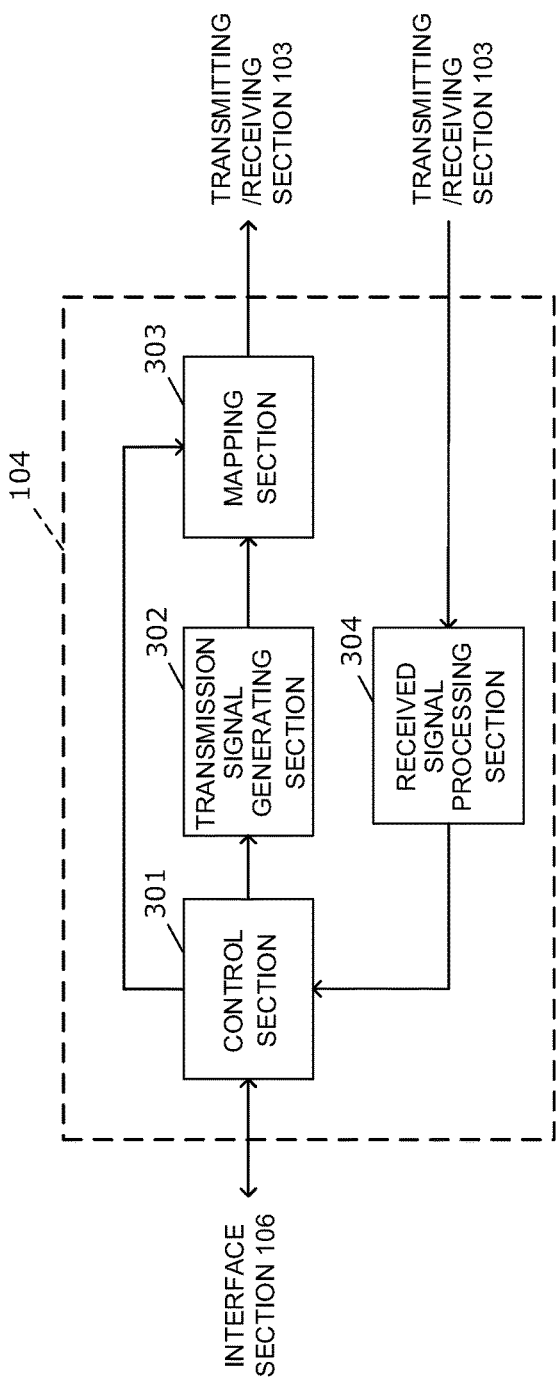
FIG. 17 is a diagram to show an example of a functional structure of a radio base station according to the present embodiment.

FIG. 17 is a diagram to show a principle functional structure of the baseband signal processing section 104 provided in the radio base station 10 according to the present embodiment. As shown in FIG. 17, the baseband signal processing section 104 provided in the radio base station 10 is comprised at least of a control section 301, a transmission signal generating section 302, a mapping section 303 and a received signal processing section 304.

The control section 301 controls the scheduling of downlink user data that is transmitted in the PDSCH, downlink control information that is transmitted in one or both of the PDCCH and the enhanced PDCCH (EPDCCH), downlink reference signals and so on. Also, the control section 301 controls the scheduling (allocation control) of RA preambles communicated in the PRACH, uplink data that is communicated in the PUSCH, uplink control information that is communicated in the PUCCH or the PUSCH, and uplink reference signals. Information about the allocation control of uplink signals (uplink control signals, uplink user data, etc.) is reported to the user terminals 20 by using a downlink control signal (DCI).

The control section 301 controls the allocation of radio resources to downlink signals and uplink signals based on command information from the higher station apparatus 30, feedback information from each user terminal 20, and so on. That is, the control section 301 functions as a scheduler. For the control section 301, a controller, a control circuit or a control device that can be described based on common understanding of the technical field to which the present invention pertains can be used.

The control section 301 controls the number of data symbols, N, used in subframes in which data transmission is carried out only in part of the OFDM symbols.

The transmission signal generating section 302 generates downlink signals based on commands from the control section 301, and outputs these signals to the mapping section 303. For example, the downlink control signal generating section 302 generates downlink assignments, which report downlink signal allocation information, and uplink grants, which report uplink signal allocation information, based on commands from the control section 301. Also, the downlink data signals are subjected to a coding process and a modulation process, based on coding rates and modulation schemes that are determined based on channel state information (CSI) from each user terminal 20 and so on. For the transmission signal generating section 302, a signal generator or a signal generating circuit that can be described based on common understanding of the technical field to which the present invention pertains can be used.

The mapping section 303 maps the downlink signals generated in the transmission signal generating section 302 to predetermined radio resources based on commands from the control section 301, and outputs these to the transmitting/receiving sections 103. For the mapping section 303, mapper, a mapping circuit or a mapping device that can be described based on common understanding of the technical field to which the present invention pertains can be used.

The received signal processing section 304 performs the receiving processes (for example, demapping, demodulation, decoding and so on) of the UL signals that are transmitted from the user terminals (for example, delivery acknowledgement signals (HARQ-ACKs), data signals that are transmitted in the PUSCH, random access preambles that are transmitted in the PRACH, and so on). The processing results are output to the control section 301. By using the received signals, the received signal processing section 304 may measure the received power (for example, the RSRP (Reference Signal Received Power)), the received quality (for example, the RSRQ (Reference Signal Received Quality)), channel states and so on. The measurement results may be output to the control section 301. The received signal processing section 304 can be constituted by a signal processor, a signal processing circuit or a signal processing device, and a measurer, a measurement circuit or a measurement device that can be described based on common understanding of the technical field to which the present invention pertains.

Figure 18:
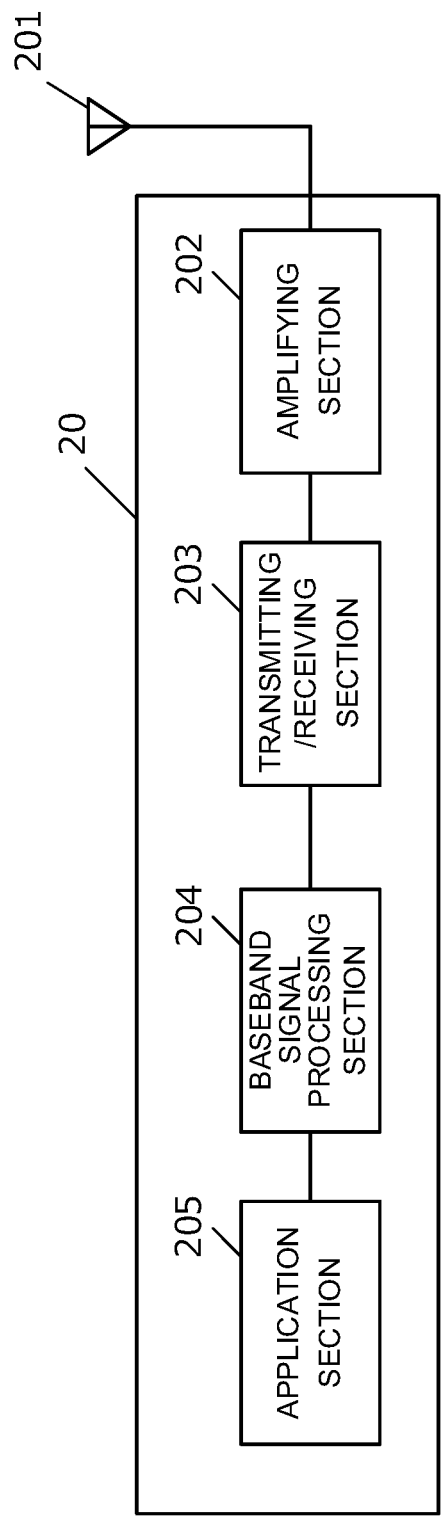
FIG. 18 is a diagram to show an example of an overall structure of a user terminal according to the present embodiment.

FIG. 18 is a diagram to show an overall structure of a user terminal 20 according to the present embodiment. As shown in FIG. 18, the user terminal 20 has a plurality of transmitting/receiving antennas 201 for MIMO communication, amplifying sections 202, transmitting/receiving sections (transmitting sections and receiving sections) 203, a baseband signal processing section 204 and an application section 205.

Radio frequency signals that are received in a plurality of transmitting/receiving antennas 201 are each amplified in the amplifying sections 202 and converted into the baseband signal through frequency conversion in the transmitting/receiving sections 203. This baseband signal is subjected to an FFT process, error correction decoding, a retransmission control receiving process and so on in the baseband signal processing section 204. In this downlink data, downlink user data is forwarded to the application section 205. The application section 205 performs processes related to higher layers above the physical layer and the MAC layer, and so on. Furthermore, in the downlink data, broadcast information is also forwarded to the application section 205. For the transmitting/receiving sections 203, transmitters/receivers, transmitting/receiving circuits or transmitting/receiving devices that can be described based on common understanding of the technical field to which the present invention pertains can be used.

Uplink user data is input from the application section 205 to the baseband signal processing section 204. In the baseband signal processing section 204, a retransmission control (HARQ) transmission process, channel coding, precoding, a discrete Fourier transform (DFT) process, an inverse fast Fourier transform (IFFT) process and so on are performed, and the result is forwarded to transmitting/receiving section 203. The baseband signal that is output from the baseband signal processing section 204 is converted into a radio frequency band in the transmitting/receiving sections 203.

After that, the amplifying sections 202 amplify the radio frequency signal having been subjected to frequency conversion, and transmit the resulting signal from the transmitting/receiving antennas 201.

Figure 19:
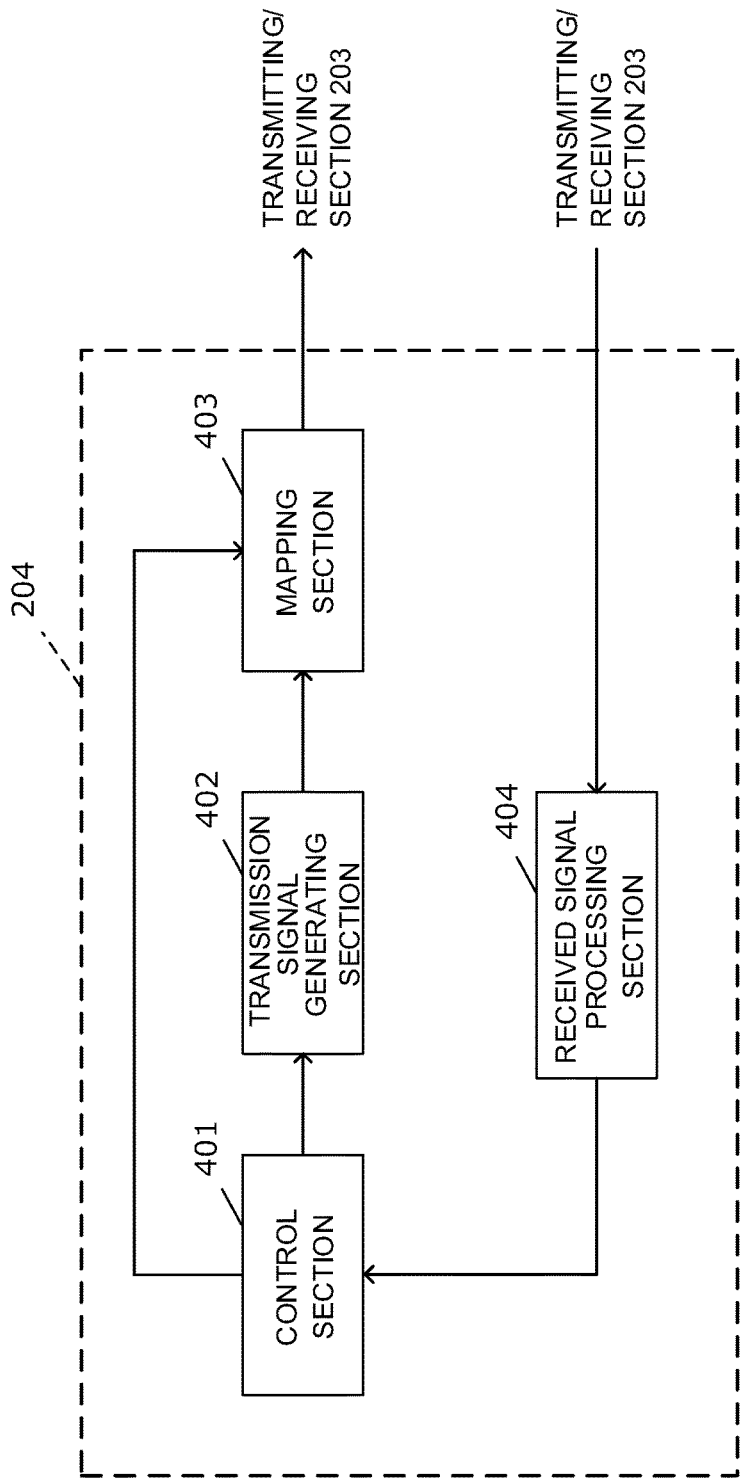
FIG. 19 is a diagram to show an example of a functional structure of a user terminal according to the present embodiment.

FIG. 19 is a diagram to show a principle functional structure of the baseband signal processing section 204 provided in the user terminal 20. Note that, although FIG. 19 primarily shows functional blocks that pertain to characteristic parts of the present embodiment, the user terminal 20 has other functional blocks that are necessary for radio communication as well. As shown in FIG. 19, the baseband signal processing section 204 provided in the user terminal 20 is comprised at least of a control section 401, a transmission signal generating section 402, a mapping section 403 and a received signal processing section 404.

For example, the control section 401 acquires the downlink control signals (signals transmitted in the PDCCH/EPDCCH) and downlink data signals (signals transmitted in the PDSCH) transmitted from the radio base station 10, from the received signal processing section 404. The control section 401 controls the generation of uplink control signals (for example, delivery acknowledgement signals (HARQ-ACKs) and so on) and uplink data signals based on the downlink control signals, the results of deciding whether or not retransmission control is necessary for the downlink data signals, and so on. To be more specific, the control section 401 controls the transmission signal generating section 402 and the mapping section 403.

The transmission signal generating section 402 generates uplink signals based on commands from the control section 401, and outputs these signals to the mapping section 403. For example, the transmission signal generating section 402 generates uplink control signals such as delivery acknowledgement signals (HARQ-ACKs) and channel state information (CSI) based on commands from the control section 401. Also, the transmission signal generating section 402 generates uplink data signals based on commands from the control section 401. For example, when an uplink grant is included in a downlink control signal that is reported from the radio base station 10, the control section 401 commands the transmission signal generating section 402 to generate an uplink data signal. For transmission signal generating section 402, a signal generator or a signal generating circuit that can be described based on common understanding of the technical field to which the present invention pertains can be used.

The mapping section 403 maps the uplink signals generated in the transmission signal generating section 402 to radio resources based on commands from the control section 401, and output the result to the transmitting/receiving sections 203. For the mapping section 403, mapper, a mapping circuit or a mapping device that can be described based on common understanding of the technical field to which the present invention pertains can be used.

The received signal processing section 404 performs receiving processes (for example, demapping, demodulation, decoding and so on) of downlink signals (for example, downlink control signals transmitted from the radio base station, downlink data signals transmitted in the PDSCH, and so on). The received signal processing section 404 outputs the information received from the radio base station 10, to the control section 401. The received signal processing section 404 outputs, for example, broadcast information, system information, paging information, RRC signaling, DCI and so on to the control section 401.

Also, the received signal processing section 404 may measure the received power (RSRP), the received quality (RSRQ) and channel states, by using the received signals. The measurement results may be output to the control section 401.

The received signal processing section 404 can be constituted by a signal processor, a signal processing circuit or a signal processing device, and a measurer, a measurement circuit or a measurement device that can be described based on common understanding of the technical field to which the present invention pertains.

Note that the block diagrams that have been used to describe the above embodiments show blocks in function units. These functional blocks (components) may be implemented in arbitrary combinations of hardware and software. The means for implementing each functional block is not particularly limited. That is, each functional block may be implemented with one physically-integrated device, or may be implemented by connecting two physically-separate devices via radio or wire and using these multiple devices.

For example, part or all of the functions of radio base stations 10 and user terminals 20 may be implemented using hardware such as ASICs (Application-Specific Integrated Circuits), PLDs (Programmable Logic Devices), FPGAs (Field Programmable Gate Arrays), and so on. The radio base stations 10 and user terminals 20 may be implemented with a computer device that includes a processor (CPU), a communication interface for connecting with networks, a memory and a computer-readable storage medium that stores programs.

Here, the processor and the memory are connected with a bus for communicating information. Also, the computer-readable recording medium is a storage medium such as, for example, a flexible disk, an opto-magnetic disk, a ROM, an EPROM, a CD-ROM, a RAM, a hard disk and so on. Also, the programs may be transmitted from the network through, for example, electric communication channels. Also, the radio base stations 10 and the user terminals 20 may include input devices such as input keys and output devices such as displays.

The functional structures of the radio base stations 10 and user terminals 20 may be implemented by using the above-described hardware, may be implemented by using software modules to be executed on the processor, or may be implemented by combining both of these. The processor controls the whole of the user terminals by running an operating system. The processor reads programs, software modules and data from the storage medium into the memory, and executes various types of processes. These programs have only to be programs that make a computer execute each operation that has been described with the above embodiments. For example, the control section 401 of the user terminals 20 may be stored in a memory and implemented by a control program that operates on the processor, and other functional blocks may be implemented likewise.

Note that the present invention is by no means limited to the above embodiment and can be carried out with various changes. The sizes and shapes illustrated in the accompanying drawings in relationship to the above embodiment are by no means limiting, and may be changed as appropriate within the scope of optimizing the effects of the present invention. Besides, implementations with various appropriate changes may be possible without departing from the scope of the object of the present invention.

The disclosure of Japanese Patent Application No. 2015-052238, filed on Mar. 16, 2015, including the specification, drawings and abstract, is incorporated herein by reference in its entirety.

The invention claimed is:

1. A user terminal communicating with a carrier where Listen Before Talk (LBT) is configured, the user terminal comprising:
    a receiver that receives, in a first subframe, Downlink Control Information (DCI) including information about a number of symbols used in a second subframe that is different from the first subframe; and
    a processor that controls a receiving process in the second subframe based on the DCI,
    wherein the second subframe is an ending subframe in burst transmission,
    the receiver receives a different DCI from the DCI, and
    the processor determines a number of symbols used in a starting subframe in the burst transmission based on the different DCI and determines the number of symbols used in the second subframe based on the information received on the DCI.

2. The user terminal according to claim 1, wherein the first subframe is a subframe immediately before an ending subframe in the burst transmission.

3. The user terminal according to claim 2, wherein the first subframe is not a starting subframe in the burst transmission.

4. The user terminal according to claim 3, wherein the DCI is in DCI format 1C that is transmitted in a search space.

5. The user terminal according to claim 3, wherein
    the processor determines the number of symbols used in the second subframe based on a relationship between patterns of the number of symbols used in the second subframe and indexes and an index included in the DCI.

6. The user terminal according to claim 2, wherein the DCI is in DCI format 1C that is transmitted in a search space.

7. The user terminal according to claim 2, wherein
    the processor determines the number of symbols used in the second subframe based on a relationship between patterns of the number of symbols used in the second subframe and indexes and an index included in the DCI.

8. The user terminal according to claim 1, wherein the DCI is in DCI format 1C that is transmitted in a search space.

9. The user terminal according to claim 8, wherein
    the processor determines the number of symbols used in the second subframe based on a relationship between patterns of the number of symbols used in the second subframe and indexes and an index included in the DCI.

10. The user terminal according to claim 1, wherein
    the processor determines the number of symbols used in the second subframe based on a relationship between patterns of the number of symbols used in the second subframe and indexes and an index included in the DCI.

11. A radio base station communicating with a user terminal with a carrier where Listen Before Talk (LBT) is configured, the radio base station comprising:
    a transmitter that transmits, in a first subframe, Downlink Control Information (DCI) including information about a number of symbols used in a second subframe that is different from the first subframe; and
    a processor that controls the number of symbols used in the second subframe,
    wherein the second subframe is an ending subframe in burst transmission, the processor controls a number of symbols used in a starting subframe in the burst transmission, and the transmitter transmits different DCI from the DCI, so as for the user terminal to determine the number of symbols used in the starting subframe in the burst transmission.

12. A radio communication method for a user terminal communicating with a carrier where Listen Before Talk (LBT) is configured, the radio communication method comprising:

receiving, in a first subframe, Downlink Control Information (DCI) including information about a number of symbols used in a second subframe that is different from the first subframe;

controlling a receiving process in the second subframe based on the DCI, the second subframe being an ending subframe in burst transmission;

receiving a different DCI from the DCI; and determining a number of symbols used in a starting subframe in the burst transmission based on the different DCI and determining the number of symbols used in the second subframe based on the information received on the DCI.

* * * * *